United States Patent [19]

O'Brien et al.

[11] Patent Number: 5,366,074
[45] Date of Patent: Nov. 22, 1994

[54] CD PACKAGE COMPRISING NON-PLASTIC PANELS

[75] Inventors: Patrick J. O'Brien, Hackensack; Herbert Friedman, Fort Lee, both of N.J.; Donald R. Ford, Louisville, Ky.; Larry Durham, Terra Haute, Ind.

[73] Assignee: Ivy Hill Corporation, New York, N.Y.

[21] Appl. No.: 25,982

[22] Filed: Mar. 3, 1993

Related U.S. Application Data

[63] Continuation-in-part of Ser. No. 983,634, Dec. 1, 1992, and a continuation-in-part of Ser. No. 807,477, Dec. 12, 1991, Pat. No. 5,219,417, which is a continuation-in-part of Ser. No. 698,201, May 10, 1991, Pat. No. 5,205,405, said Ser. No. 983,634, is a continuation of Ser. No. 817,897, Jan. 8, 1992, Pat. No. 5,188,230.

[51] Int. Cl.⁵ ............................................. B65D 85/57
[52] U.S. Cl. .................................. 206/312; 206/310; 206/444
[58] Field of Search ................................ 206/309–313, 206/444, 232, 472, 45.13

[56] References Cited

U.S. PATENT DOCUMENTS

| | | | |
|---|---|---|---|
| 4,640,413 | 2/1987 | Kaplan et al. | 206/312 X |
| 4,709,812 | 12/1987 | Kosterka | 206/310 |
| 4,765,462 | 8/1988 | Rose, Jr. | 206/45.13 |
| 4,765,466 | 8/1988 | Ivey | 206/232 |
| 5,193,681 | 3/1993 | Lievsay | 206/444 |

OTHER PUBLICATIONS

Wall Street Journal "Marketplace", Jul./Aug. 1991.

Primary Examiner—Bryon P. Gehman
Attorney, Agent, or Firm—Amster, Rothstein & Ebenstein

[57] ABSTRACT

In a storage package for a recording medium having a plurality of non-plastic panels (including a pair of end panels) and a holder formed of plastic disposed on one of the panels for receiving and maintaining a recording medium thereon, the improvement wherein (A) a given panel configured and dimensioned to removably receive printed matter therein, (B) the one panel additionally defines at least one lateral spine visible when the plurality of panels is in a collapsed orientation, and (C) the holder is releasably secured to the one panel and easily removable therefrom.

40 Claims, 5 Drawing Sheets

CD PACKAGE COMPRISING NON-PLASTIC PANELS

CROSS-REFERENCE TO RELATED APPLICATIONS

This is both a continuation-in-part of U.S. patent application Ser. No. 07/983,634, filed Dec. 1, 1992, itself a continuation of U.S. patent application Ser. No. 07/817,897 filed Jan. 8, 1992, now U.S. Pat. No. 5,188,230, and a continuation-in-part of U.S. patent application Ser. No. 07/807,477, filed Dec. 22, 1991, now U.S. Pat. No. 5,219,417, itself a continuation-in-part of U.S. patent application Ser. No. 07/698,201, filed May 10, 1991, now U.S. Pat. No. 5,205,405.

BACKGROUND OF THE INVENTION

The present invention relates to a storage package for a recording medium, such as a compact disc, and more particularly to such a storage package which is formed of a plurality of non-plastic panels and a plastic holder.

The term "recording medium" as used herein and in the claims broadly encompasses any medium on which information may be digitally recorded, regardless of whether the recorded data represents text, images, audio, video, binary data, or combinations thereof. The common recording media are compact discs (CD's) which in turn encompass a wide variety of digitally encoded recording media including the common CD (with an outer diameter of 4.7 inches), smaller versions thereof (including the mini- and micro-discs) as well as larger versions thereof, and CD-ROM's, whether blank or prerecorded, and whether read only or read/write in nature.

Commonly assigned U.S. patent applications Ser. No. 07/698,201, now U.S. Pat. No. 5,205,405, Ser. No. 07/807,477 and Ser. No. 07/817,897, now U.S. Pat. No. 5,188,230 disclose storage packages for a recording medium. The disclosures of the aforementioned applications are incorporated herein by reference as fully as if they were set out herein.

Each of the three storage packages comprises a plurality of non-plastic (typically paperboard) panels movable between an open orientation enabling access to the contempts of the package and a collapsed orientation for storage purposes. The plurality of panels includes a pair of end panels and optionally one or more panels intermediate the end panels. Each of the panels has a generally planar and a generally rectangular panel body, a pair of opposed transverse panel ends, and a pair of opposed lateral panel sides. The storage package additionally comprises a holder formed of plastic disposed on one of the panels for receiving and maintaining thereon a recording medium such as a compact disc (CD). The holder has a generally planar and generally rectangular holder body, a pair of opposed lateral holder sides, and a pair of opposed transverse holder ends.

More particularly, in the storage package of application Ser. No. 07/698,201, the holder includes a tray adapted to releasably receive the recording medium thereon and a base in telescopic relation with the tray. The holder is movable from a spanning configuration wherein the base and the tray are substantially untelescoped to a telescoped configuration wherein the base and the tray are substantially overlying. The holder is useful in an ecologically and economically desirable package which is switchable from an extended blank orientation, through an intermediate display orientation, to a collapsed home orientation. The package in the extended blank orientation has each of the sections disposed in a common plane, in the collapsed home orientation has each of the sections substantially overlying with the holder disposed in the telescoped configuration, and in the intermediate display orientation has sections disposed in first and second planes with the holder disposed in an intermediate plane in the spanning configuration to preclude folding the package into the collapsed home configuration prior to movement of the holder to the telescoped configuration. In the intermediate display orientation, the package is about twice as long as it is in the collapsed home orientation so that it cannot easily be concealed in a pocket by a shoplifter. A non-pivotable end cap is disposed on one of the end panels and is adapted to releasably engage the holder when the plurality of panels is in the collapsed orientation, thereby to preclude accidental movement of the plurality of panels out of the collapsed orientation.

In the storage package of application Ser. No. 07/807,477, the holder is of one-piece construction and the various major parts thereof are not in telescopic relationship, and the package has no intermediate display orientation.

The storage package of application Ser. No. 07/817,897 is similar to that of the preceding application except that the end cap is pivotally disposed on the holder and is preferably an actual part thereof connected to the remainder by a living hinge. The pivotable end cap makes the storage package easier to open than the earlier packages or the conventional "jewel box" package.

The present invention is directed to improvements in the aforementioned packages and, although the improvements will be described in connection with the package on the last filed application, Ser. No. 07/817,897, it should be appreciated that the improvements thereof may be provided in the packages of the two earlier filed applications as well.

The storage packages of the aforementioned application, like the conventional storage packages for compact discs, are not square in plan view, but rather rectangular, having a pair of opposed transverse panel ends shorter than the pair of opposed lateral panel sides. The packages of the aforementioned applications provide at least one paperboard spine on a short transverse end of the package. The spine extends the full thickness of the plurality of panels in the collapsed orientation and is a convenient and economical place to identify by printed indicia the subject matter of the recording medium and the like. However the disposition of the spine on a short transverse end of the package does not permit as much information to be disposed thereon as would be the case if the spine were disposed on a longer lateral side. But these longer lateral sides are defined by a plastic holder and thus are not readily and economically suitable for imprinting with information, especially multi-color information. Nonetheless, display and storage devices for holding a plurality of the storage packages are now being manufactured which have a long lateral side of the package either as visible to the viewer as the short transverse end thereof or even exclusively visible. Thus, it is desirable, if not mandatory, that a storage package suitable for use in such a device be provided with a lateral side spine which is visible when the plurality of panels is in the collapsed orientation and which may easily and economically be imprinted with information (that is, have a non-plastic surface).

The storage packages of the aforementioned applications provide large areas of coated paperboard which may conveniently be imprinted with text, images, and the like so that the manufacturer can impart information, advertising and the like to the purchaser. However, it has been found that frequently the quality of information which the manufacturer wishes to impart to the purchaser exceeds that which will fit on the panel faces. Thus, the manufacturer may put the information in a booklet which is disposed within the storage package at the time of sale. While the booklet could be inserted loosely intermediate the panels of the package, care had to be taken that it did not contact and possibly damage the surfaces of the recording medium, for example, the top and bottom surfaces of a compact disc. Additionally, if the booklet were simply placed intermediate the panels of the package, there was a tendency for the booklet to become lost when the package was put in the open orientation and there was then nothing holding the booklet to the package. Thus, there is a need for a storage package which will contain a compartment for a booklet so that the booklet remains removably "connected" to the package (unless intentionally removed) where it cannot damage the recording medium (that is, it is not in contact with the recording medium).

The packages of the aforementioned applications represent significant ecological advances relative to the conventional CD "jewel box" package and, indeed, most other packaging heretofore suggested for CD's. However, in certain highly ecologically-minded countries, there is a requirement that plastic and paper materials be separated from one another prior to disposal. It can readily be appreciated that this presents a substantial problem where the plastic and paperboard portions of a storage package are glued or otherwise adhered together, through the use of glues, adhesives or the like, as the plastic and paperboard components are no longer easily separable. Thus, the need remains for packaging wherein the plastic and paperboard components are not glued or adhered together and are easily separable.

Accordingly, it is an object of the present invention to provide a storage package for a recording medium which has a paperboard lateral spine which can be easily and economically imprinted with identifying indicia.

Another object is to provide a storage package which provides a compartment for releasably holding a booklet and maintaining the booklet away from the recording medium.

A further object is to provide a storage package wherein the plastic components (i.e., the holder or holder and end cap) are releasably secured to the non-plastic component (i.e, the paperboard panels) and easily removable therefrom.

It is also an object of the present invention to provide a storage package which in preferred embodiments incorporates one or more of the features described above, for example, an imprinted lateral spine, a booklet compartment, and an easily releasable attachment of the plastic and non-plastic components.

It is a further object to provide such a package which in preferred embodiments may be used in conjunction with new devices for the storage and display of packages wherein the lateral spine of the package is (exclusively or non-exclusively) visible, which enables the manufacturer to safely provide the user with a removable booklet of printed information, and which facilitates an ecologically desirable separation between the plastic and non-plastic components thereof.

It is another object to provide such a package which is economical to manufacture and easy to use.

SUMMARY OF THE INVENTION

It has now been found that the above and related objects of the present invention are obtained in a storage package for a recording medium comprising a plurality of non-plastic panels and a plastic holder. The plurality of non-plastic panels includes a pair of end panels, the plurality of panels being movable between an open orientation enabling access to the contents of the package and a collapsed orientation for storage purposes. Each of the panels has a generally planar and generally rectangular panel body, a pair of opposed transverse panel ends, and a pair of opposed lateral panel sides. The plastic holder is disposed on one of the panels for receiving and maintaining a recording medium thereon. The holder has a generally planar and generally rectangular holder body, a pair of opposed lateral holder sides, and a pair of opposed transverse holder ends. The holder is releasably secured to the one panel and easily removable therefrom. A given panel, which is one of the end panels and is not the one panel on which the holder is disposed, defines a compartment having a pair of opposed lateral compartment sides and a pair of opposed transverse compartment ends, the compartment having an open transverse compartment end at one end of the plurality of panels and being configured and dimensioned to removably receive printed matter therein. The one panel additionally defines at least one lateral spine visible when the plurality of panels is in the collapsed orientation.

In a first preferred embodiment wherein the holder is releasably secured to the one panel and easily removable therefrom, the package additionally includes releasable locking means, operative when the plurality of panels is in the collapsed orientation, to preclude accidental movement of the plurality of panels out of the collapsed orientation. The releasable locking means is releasably secured to the one panel and easily removable therefrom. Preferably both the releasable locking means and the holder are releasably secured to the one panel without the use of glue.

In a first preferred variant of the first embodiment the one panel defines a series of panel apertures adjacent each of its lateral panel sides, the holder body defines adjacent each of its lateral holder sides a series of laterally spaced first mating elements, and the holder additionally includes a pair of lateral extensions. Each lateral extension is pivotally secured (e.g., by a living hinge) to a respective lateral holder side and defines a series of laterally spaced second mating elements releasably engageable with the series of first mating elements. Each lateral extension is pivotable between a non-engaging orientation wherein the series of first and second mating elements are spaced from each other to permit removal of the one panel from the holder and an engaging orientation wherein one of the series of first and second mating elements extends through the panel apertures and releasably engages the other of the series of first and second mating elements. Preferably the first mating elements are lugs, the second mating elements are recesses, and the lugs are frictionally engaged by the recesses when the lateral extensions are in the engaging orientation.

In a second preferred variant of the first embodiment, each of the lateral holder sides defines at least one inwardly turned laterally extending lug (preferably a plurality of laterally spaced lugs) vertically spaced from the holder body, the lateral panel side on each lateral side of the one panel being frictionally engaged between the at least one lug and the holder body.

In the second preferred variant, the one panel defines an opening therethrough, and the holder defines a pin projecting outwardly from the holder body and through the one panel opening, thereby to assist in fixing the one panel on the holder against relative movement. Preferably the pin has a free end of greater diameter than the one panel opening. Alternatively, the plurality of panels defines a strip disposed intermediate the one panel and an adjacent one of the panels and adjacent one transverse holder end, the strip defining at least a pair of transversely spaced strip apertures. The holder body defines adjacent the one transverse holder end at least a pair of transversely spaced first mating elements, and the holder additionally includes a pair of transversely spaced transverse extensions adjacent the one transverse end. Each transverse extension is pivotally secured (preferably by a living hinge) to a respective lateral holder side and defines at least one second mating element releasably engageable with one of the first mating elements. Each transverse extension is pivotable between a non-engaging orientation wherein the first and second mating elements are spaced from each other to permit removal of the plurality of panels from the holder end and an engaging orientation wherein one of the first and second mating elements extends through the strip apertures and releasably engages the other of the first and second mating elements to releasably secure the plurality of panels and the holder together. Preferably the first mating elements are lugs, the second mating elements are recesses, and the lugs are frictionally engaged by the recesses when the transverse extensions are in the engaging orientation. The one panel may define an opening therethrough, and the holder may define a pin projecting outwardly from the holder body and through the one panel opening, thereby to assist in fixing the one panel on the holder against relative movement.

In a second preferred embodiment wherein the one panel additionally defines at least one lateral spine visible when the plurality of panels is in the collapsed orientation, the lateral spine is defined by an extension of one of the panel sides of the one panel, the lateral spine extending generally perpendicular to the body of the one panel and being secured to one of the holder sides. Preferably the lateral spine typically has visibly displayed thereon identifying indicia for the package and extends at least a major portion of the length of the one panel side. Optimally, the one holder side defines a recess communicating with the one panel side for receipt of the lateral spine, the recess being of sufficient depth to accommodate the full thickness of the lateral spine so that the lateral spine does not project laterally outwardly of the one holder side. Optionally, the plurality of panels in the collapsed orientation additionally defines at least one transverse spine.

In a third preferred embodiment, a given panel, which is one of the end panels and is not the one panel on which the holder is disposed, defines a compartment having a pair of opposed lateral compartment sides and a pair of opposed transverse compartment ends, the compartment having an open transverse compartment end at one end of the plurality of panels and being configured and dimensioned to removably receive printed matter therein. The given panel is defined by at least one folded-over flap, with one lateral compartment side formed by folding over of the flap and the other lateral compartment side formed by securing portions of the adjacent lateral edges of the folded-over flap together, the flap having means associated therewith for securing portions of a pair of adjacent transverse edges of the folded-over flap together to define a closed transverse compartment end. Preferably the package additionally includes releasable locking means, operative when the plurality of panels is in the collapsed orientation, to preclude accidental movement of the plurality of panels out of the collapsed orientation, the releasable locking means when operative furthermore functionally closing the open transverse compartment end.

BRIEF DESCRIPTION OF THE DRAWING

The above brief description of the present invention, as well as further objects, advantages and features of the present invention, will be more fully understood by reference to the following detailed description of the presently preferred, albeit illustrative, embodiments of the present invention thereof when taken in conjunction with the accompanying drawing wherein.

DETAILED DESCRIPTION OF THE PREFERRED EMBODIMENTS

Figure 1:
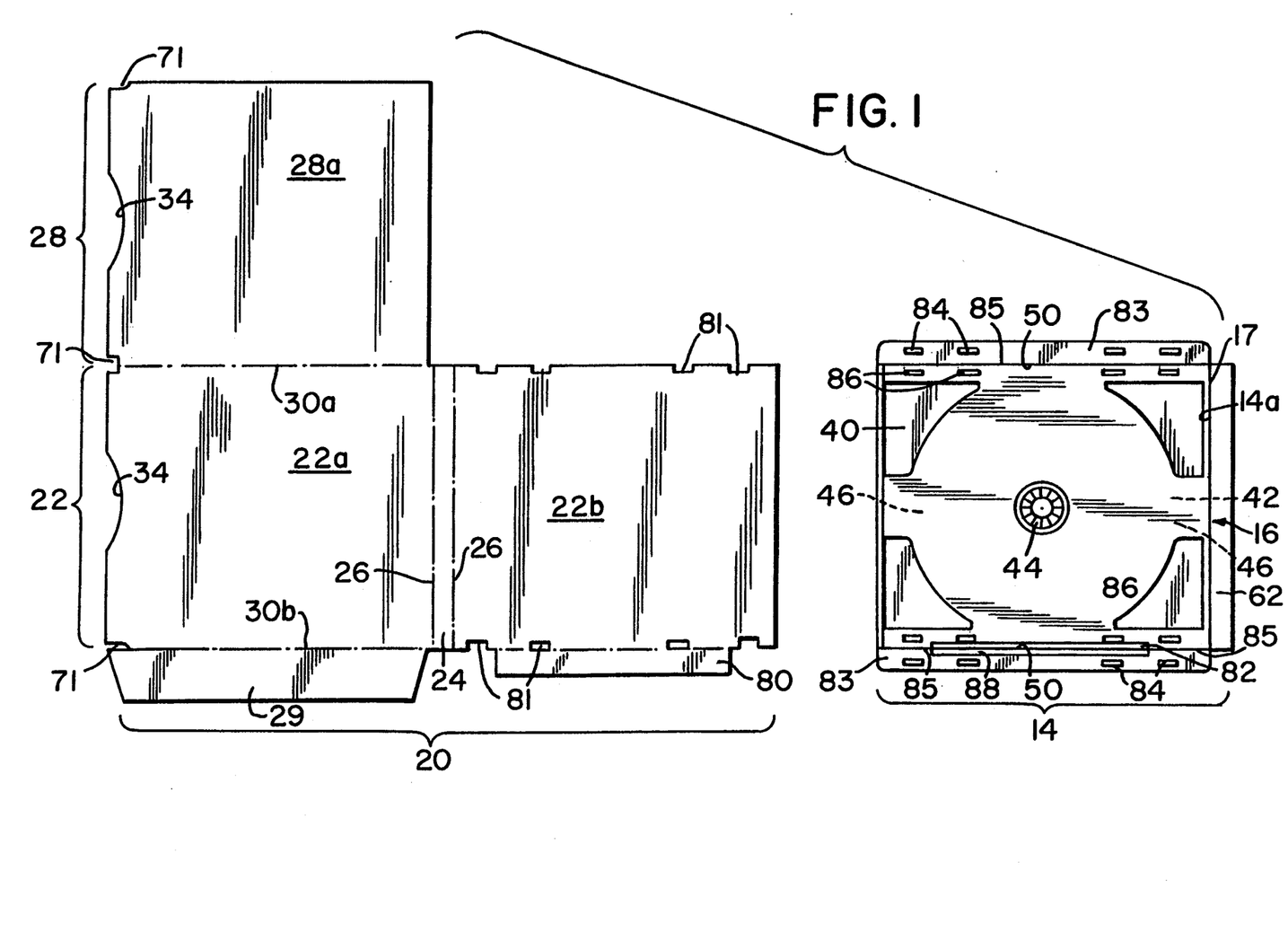
FIG. 1 is an exploded bottom plan view of the holder and a paperboard blank which may be used to form a first embodiment of a package according to the present invention.

Referring now to the drawing, and in particular to FIGS. 1-5 thereof, therein illustrated is the first embodiment of a storage package according to the present invention, generally designated by the reference numeral 10. The storage package 10 is illustrated in FIG. 1 as formed from a non-plastic blank generally designated 20, which may be folded and glued to form a plurality of non-plastic panels generally designated 12 (see FIG. 2), and a holder formed of plastic generally designated 14, which includes an end cap formed of plastic generally designated 16. Unlike the all-plastic jewel box conventionally used for the storage of CD's, the packaging of the present invention is to a large extent formed of non-plastic panels 12, the latter preferably being formed of paperboard which readily decomposes under landfill conditions and is thus more ecologically acceptable than plastic. Moreover, both the paperboard and plastic components of the present invention may be made from recycled materials and are themselves recyclable, thereby rendering the package not only ecologically but also economically sound.

While a two-panel embodiment of a package according to the present invention is illustrated, similar packages utilizing the principles of the present invention may be formed from a greater number of panels by the inclusion of optional intermediate panels (not shown) intermediate the end panels.

Referring now to FIG. 1 in particular, the plurality of non-plastic panels 12 may be formed from a prescored, preprinted unitary blank or sheet generally designated 20. The blank 20 is preferably divided into rows. The first row 22 has a number of rectangular sections equal to the number of panels in the plurality (here, two): namely, the sections 22a and 22b. The two sections 22a, 22b in the first row 22 are separated from each other by a strip 24 having a width which is small relative to the width of the sections, the strip 24 being bounded by foldlines 26. As will become apparent hereinafter, the width of the strip 24 will be determined by the need of the strip to accommodate the gap between adjacent rectangular sections 22 when the plurality of panels 12 is disposed in a collapsed orientation for storage purposes, with each of the panels 12 being in overlapping relationship.

For reasons of economy, the blank 20 is typically multi-color printed on only one surface thereof, although it is desirable for aesthetic reasons that both major surfaces of the panels 12 which will be exposed to view be multi-color printed. The opposed surface of the blank 20 is typically either left in its original color or printed with only a single color. Accordingly, the blank 20 preferably also has a second row 28 composed of one or more unconnected rectangular sections such as section 28a. Thus, when rectangular sections 22a and 28a are both multi-color printed on only one surface, one section is then folded over a foldline 30a therebetween so as to be in overlapping relationship with the other section and define a panel (here panel 12a of FIG. 2) with the multi-color printed surfaces of the sections exposed and the non-multi-color printed surfaces facing each other and thus hidden from view.

Preferably, for a variety of reasons, there is no section in the second row 28 adjacent the section 22b, which is adapted to receive the holder 14. First, since section panel 22b will have one surface totally covered by the holder 14, there is no aesthetic reason for having an adjacent section in the row 28. Second, the non-multi-color-printed or non-coated surface of section 22b enables the holder 14 to be better secured thereto than it would be to a multi-color-printed surface if it is to be secured by glue, adhesive or the like. Third, the missing section is not necessary to impart additional strength and rigidity to the section 22b (as it would if the missing section and section 22b were folded over and glued together) since section 22b is subsequently strengthened and rigidified by the presence thereon of the holder 14. Fourth, the missing section would unnecessarily increase the thickness of the entire package in its collapsed orientation, this being a particular problem where the package is intended to occupy the same volume as a conventional jewel box (for example, to enable the use of existing storage facilities for conventional jewel-box CD packaging).

Section 28a may be folded over and glued to adjacent section 22a to form an end panel 12a. However, as earlier noted, it is frequently desirable to place within a compartment of the CD packaging removable literature such as a booklet B describing the prerecorded matter, the creation of the matter, the artist, instructions for use, advertising or the like. To permit this, the section 28a may be glued to the section 22a only by a glue flap 29, the glue flap 29 being connected to the free lateral side of section 22a by a foldline 30b and glued section 28a so as to define an end panel 12a having an open-ended pocket or compartment 32 into which such literature or booklet may be stored. To facilitate access to the compartment 32, panel 12a preferably defines a concave cutout 34 at its free end. If desired, the other end of compartment 32 may be sealed by the use of glue, adhesive or the like, although in particular instances this may be unnecessary since the presence of the holder 14 or panel 12b may effectively seal such other end of the compartment 32.

Figure 2:
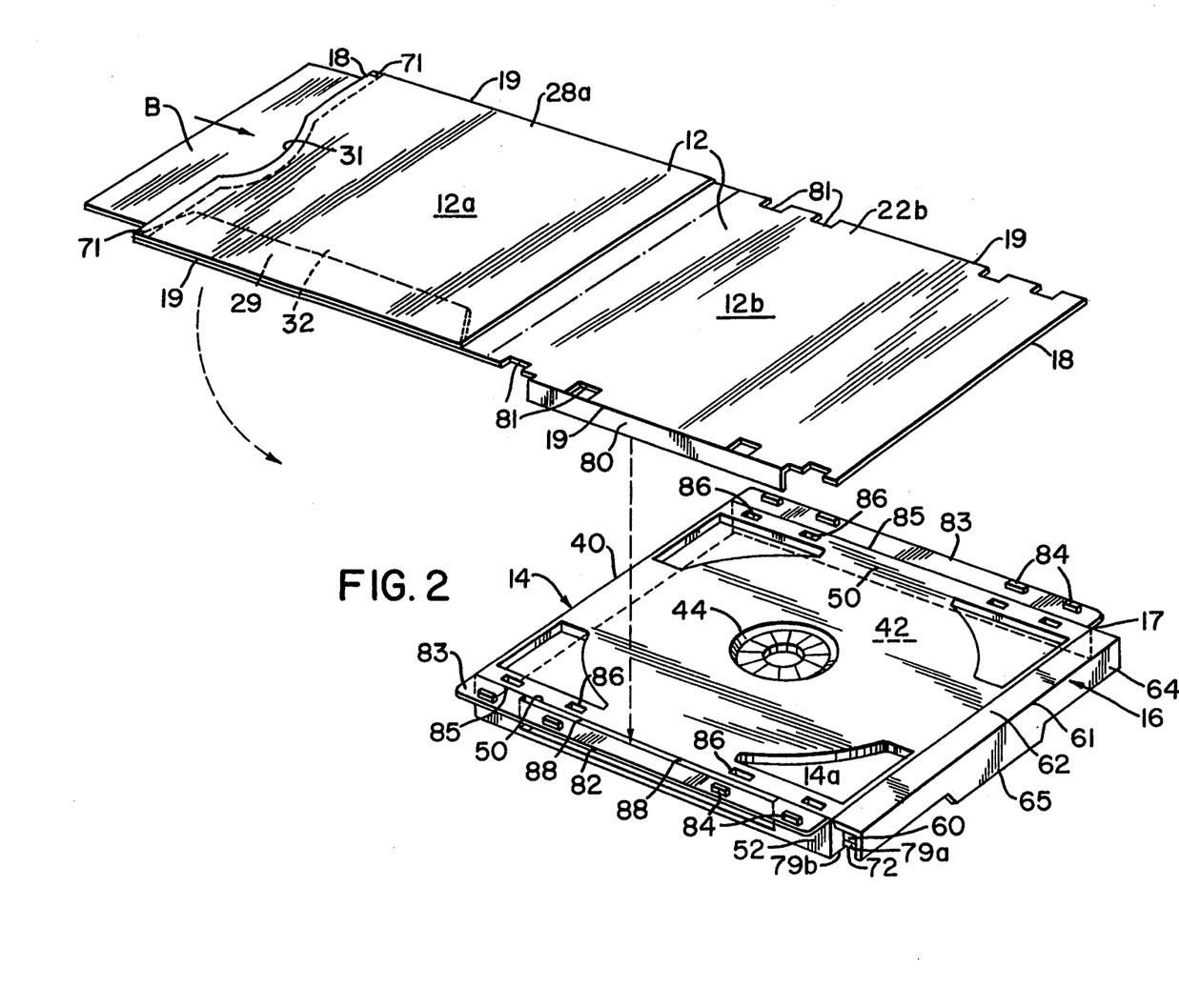
FIG. 2 is an inverted isometric view of the components of FIG. 1 in an intermediate stage of assembly.

Referring now to FIG. 2, the plurality of non-plastic panels 12 formed from the blank 20 (after folding and gluing of the section(s) of the second row 28 to the adjacent section(s) of the first row 22) include a pair of end panels 12a and 12b and optionally one or more panels (not shown) intermediate to and connecting the pair of end panels 12a, 12c. The plurality of panels 12 further defines a pair of opposed free or transverse ends 18 and a pair of opposed, typically longer lateral sidewalls 19. Panel 12b is, of course, composed only of section 22b.

Figure 3:
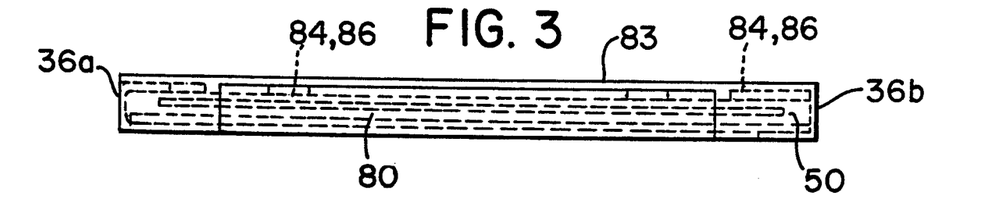
FIGS. 3 and 4 are side elevational and bottom plan views, respectively, of the first embodiment of the package in the collapsed orientation.
Figure 4:
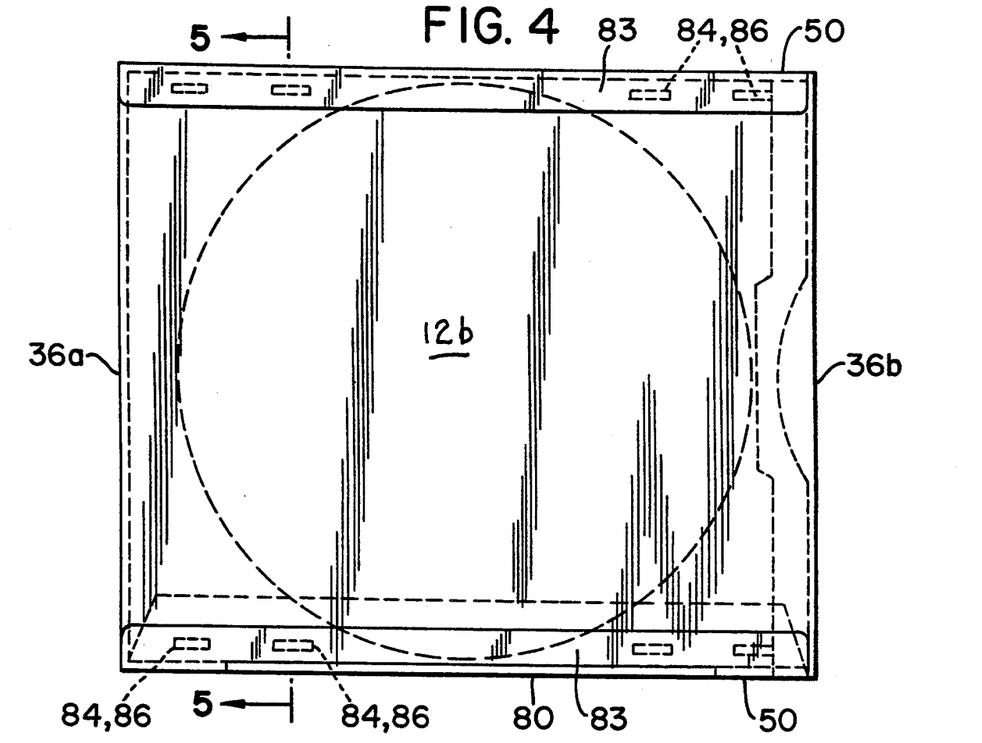
Figure 5:
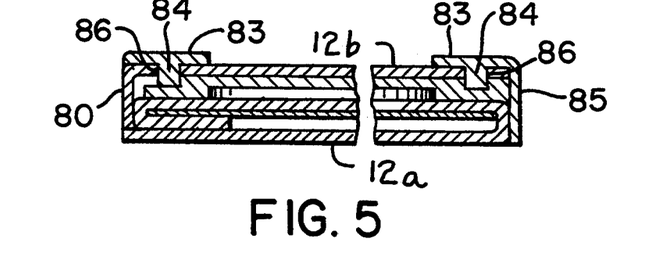
FIG. 5 is a fragmentary sectional view thereof taken along the line 5—5 of FIG. 4.

Referring now to FIGS. 3–5 as well, the plurality of panels 12 is movable between an open orientation enabling access to the contents of the package (see FIG. 2), through an optional intermediate orientation for packages of three or more panels (not shown) wherein some but not all of the panels are overlapping, and a collapsed orientation for storage purposes (see FIGS. 3–5) wherein all of the panels are overlapping. In other words, in the open orientation there is no panel overlying the panel 12b on which the holder 14 is disposed, thereby enabling access to the holder 14 and any compact disc thereon, and in the collapsed orientation each of the panels 12a, 12b overlaps one another, thereby to provide a compact package for storage. The plurality of panels 12 in the collapsed orientation defines a pair of opposed transverse end spines 36a, 36b for the package (see FIG. 3), a first transverse end spine 36a composed primarily of the fold 24 intermediate panels 12a, 12b and a second transverse end spine 36b at the opposite end formed by the free ends of panels 12a, 12b.

Referring now to FIGS. 1–2 and 4 in particular, the holder 14 preferably comprises an injection molded plastic element which differs in particular respects from the holder found in the conventional prior art jewel box. In its conventional aspects, the holder 14 has a generally planar rectangular body 40 defining a recess 42 on the exposed surface thereof configured and dimensioned to receive a centrally apertured CD.. The depth of the recess 42 is sufficient to ensure that the upper surface of the CD does not extend above the surface of the holder body 40 about the recess 42. A retaining element 44 is centrally disposed in recess 42, projecting upwardly therefrom, for retaining the CD in holder 14. Any of the conventional means for providing frictional engagement between the retaining element 44 and the inner circumference of the CD may be used— for example, upstanding pliable plastic tabs such as those used in the holder of the conventional jewel box to frictionally engage the inner circumference of the central hole of the CD and thus hold the CD in place.

Additionally, a plurality of finger slots or recesses 46 (two being illustrated) are preferably provided so that the user can slide a finger below the edge of the CD while simultaneously exerting a slight downward force on the retaining means 44 to facilitate disengagement of the CD from retaining element 44 for removal of the CD from the recess 42. The finger recesses 46 are preferably disposed at opposite ends of a diameter of the holder recess 42 extending from end to end of holder 14, for example, parallel to the sidewalls thereof.

The holder 14 of the present invention further includes a pair of opposed lateral sidewalls generally designated 50, disposed slightly outwardly from the sidewalls 19 on panel 12b on which it is disposed. Each sidewall 50 of the holder 14 extends substantially above the plane of the holder body 40 for essentially the entire length of the holder 14, and also defines a holder engagement means which functions to releasably engage cooperating end cap engagement means disposed on the end cap 16 (the specific engagement means to be described hereinafter) to maintain the package in the collapsed home orientation with all portions of the sidewalls 19 of end panel 12a protected by the holder sidewalls 50.

The plastic end cap 16 is directly pivotally secured to the holder 14, and more particularly to the adjacent end 14a of the holder 14. (In other words, end cap 16 is disposed on the holder end 14a remote from the end panel 12a as illustrated in FIG. 2.) The end cap 16 is secured to the holder end 14a by a living hinge 17 and is of unitary, one-piece, integral construction with the holder 14, both being formed together in a single molding operation. The plastic utilized for the holder 14 and end cap 16 (and, of course, living hinge 17) must be strong, yet substantially flexible when thin so as to be capable of forming a living hinge, and polypropylene is preferred. The living hinge 17 extends substantially the entire width of the holder 14 between the sidewalls 50 thereof. The living hinge 200 is preferably formed as a line of reduced thickness in the plastic intermediate holder 14 and end cap 16, with the facing portions of those elements adjacent the living hinge 17 preferably being beveled so as to enable a pivotal movement of the end cap 16 through at least 90°. The end cap 16 is typically the same color as the holder 114.

End cap 16 is generally U-shaped and has a pair of upstanding opposed lateral sidewalls 60 and a connecting portion generally designated 61, connecting the same. The connecting portion 61 is "L"-shaped in cross-section and includes a bight portion 62 and an upstanding end wall 64 which is perpendicular to bight portion 62. The end wall 64 is configured and dimensioned to serve as a latch and preferably includes a lip 65 on its free end to facilitate grasping of end cap 16 and improve the leverage exertable thereon by a user for pivoting thereof. End cap 16 is pivotable about the living hinge 17 from a non-latching orientation wherein the bight portion 62 is in generally the same plane as the holder 14 and the end wall 64 is transverse thereto (as illustrated in FIG. 2) and a latching orientation wherein the bight 60 portion 62 is substantially transverse to the plane of the holder 14 and the end wall 64 is generally parallel thereto (as illustrated in FIGS. 3-5). The end cap sidewalls 60 are connected directly to both bight portion 62 and end wall 64, and each defines an end cap engagement means 72 adapted to releasably engage the cooperating holder engagement means 70 on each holder sidewall 50.

In order to enable engagement of the engagement means 72, 70, the sections 22a, 28a of blank 20 which form the end panel 12a are preferably provided with cutaway portions 71 adjacent each lateral side thereof, at the transverse end 18 which will underlie the end cap 16 when the storage package is in the collapsed home orientation with the end cap 16 precluding an accidental movement of the panels out of the collapsed home orientation. The cutaway portions 71 are configured and dimensioned to enable passage of the end cap sidewalls 60 through the plane of the end panel 12a without interference.

The end cap sidewalls 60 are resiliently biased outwardly and spaced apart such that they are readily received between the holder sidewalls 50 as the end cap 16 is moved into the latching orientation, with the engagement means 70, 72 of the holder 14 and the end cap 16, respectively, releasably engaging. To enable easy pivotal movement of the end cap 16 to the latching orientation, the holder sidewalls 50 about the engagement means 72 are preferably resiliently outwardly flexible so as to flexingly accommodate passage of the lugs 70 over the end cap sidewalls 60 until the lugs 70 seat in the end cap apertures 72. Alternatively or addition thereto the end cap sidewalls 60 may be resiliently inwardly flexible.

As illustrated, holder engagement means 70 are inwardly projecting lugs on the inner surface of each holder sidewall 50, and the end cap engagement means 72 are apertures or recesses on the outer surface of each end cap sidewall 60 configured and dimensioned to receive and releasably retain projecting lugs 70 therein, thereby to preclude accidental movement of the plurality of panels 12 out of the collapsed orientation. Clearly, however, the projecting lugs 70 could be outwardly projecting lugs on the outer surface of the end cap sidewalls 60 and the apertures or recesses 72 could be on the inner surface of the holder sidewalls 50. Indeed, easily releasable engagement means other than an aperture-and-lug system may be substituted or there may be an aperture-and-lug system at one side of the end cap and a lug-and-aperture system at the other side.

Alternatively, the end cap sidewalls 60 may be further spaced apart then the holder sidewalls 50, with the end cap engagement means 72 being disposed on the inner surface of each end cap sidewall 60 and the holder engaging means 70 being disposed on the outer surface of each holder sidewalk 50, the projecting lugs being configured and dimensioned to project into the recesses or apertures. In this case cutaway portions 71 are not required. However, typically the end cap sidewalls 60 should not be disposed outwardly of the planes of the holder sidewalls 50, as this increases the overall size of the packaging without a corresponding benefit.

In order to limit the pressure exerted by the end cap latch 64 on the holder 14, and thus on any compact discs disposed within the holder recess 42, the end cap sidewall 60 defines an abutment surface 79a, and each holder body 40 defines a fixed abutment surface 79b which is adapted to engage abutment surface 79a and function as a stop to limit movement of the end cap 16 from its non-latching orientation beyond its latching orientation. Alternatively, or in addition thereto, the appropriately beveled surfaces of the holder 14 and end cap 16 about the living hinge 17 may also limit the pressure exerted downwardly by the end cap latch 64 on holder 14.

The panel 12b (formed of section 22b of blank 20) preferably defines an extension 80 along a major portion of one lateral side thereof, the extension 80 being adapted to be secured to the outer surface of one holder sidewall 50. The extension 80 serves as a lateral side spine and may be easily and inexpensively multi-color-printed with identifying information for the CD in the package since the coated side of the blank is exposed in the package. Preferably the outer surface of holder sidewall 50 defines a recess 82 adapted to receive the extension 80 therein so that the edges or extension 80 are protected against dog-earing, fraying or the like. The recess 82 is of sufficient depth to accommodate the single paperboard thickness of extension 80 plus any layer of glue used to secure the extension 80 to the holder sidewall 50. Where it is desired to avoid the use of glue between paperboard and plastic components of the storage package, the edges of the holder sidewall 50 about recess 82 may define three inwardly extending ledges or shoulders (not shown) for retaining the three outer edges of the extension 80 within the recess 82 without the use of glue. However, this is generally unnecessary, as the amount of glue required to secure the extension 80 to the layer 14 is sufficiently small that extension 80 is easily stripped from the holder sidewall 50. If desired, another lateral side extension 80 may be disposed on the other side of the panel 12b and another recess 82 disposed on the outer surface of the other holder sidewall 50 to permit lateral side spines on both sides of the package.

While holder 14 may be permanently secured to panel 12b by the conventional use of glues, adhesives and the like, it is preferred that the holder 14 and panel 12b be releasably secured together and easily removable from one another in order to facilitate eventual intentional separation of the plastic and non-plastic components of the storage package for ecological disposal. Accordingly, in the first preferred embodiment illustrated in FIGS. 1–5, the panel 12b to which the holder 14 is secured is provided with a plurality of longitudinally spaced panel apertures 81 along each lateral side thereof and extending through the thickness or the panel 12b. Typically the panel apertures 81 are cutaway portions bordering a panel side and thus not extending a full 360°; however, where the panel 12b includes an extension 80, some of the panel apertures 81 will be slots, with the extension 80 forming one side of the slot so that the slot is bordered on all sides. The purpose of the panel apertures 81 will become evident hereinafter.

The holder 14 defines additionally a pair of lateral extensions 83, each such lateral extension 83 being pivotally secured (preferably by a living hinge 85) to a respective lateral holder sidewall 50 for movement between a panel-securing orientation (as illustrated in FIG. 4 and a panel-releasing orientation (as illustrated in FIGS. 1 and 2). Each lateral extension 83 defines a series of laterally spaced mating elements 84 which are adapted to releasably engage with a like series of laterally spaced mating elements 86 which are disposed on each lateral holder sidewall 50. Each of the lateral extensions 83 is pivotable between a non-engaging panel-releasing orientation wherein the two adjacent series of mating elements (that is, the mating elements 84 on one lateral extension 83 and the mating elements 86 on the holder sidewall 50 adjacent thereto) are spaced from each other to permit removal of the panel 12b from the holder 14 and an engaging or panel-securing orientation wherein one of the two series of mating elements 84, 86 extends through the panel apertures 81 to releasably engage the other of the two series of mating elements 84, 86 and fix the holder 14 and panel 12b together.

Typically one series of mating elements 84, 86 is lugs and the other series of mating elements 86, 84 recesses, with the lugs being frictionally engaged by the recesses when the lateral extensions 83 are in the engaging orientation. Either of the mating elements 84, 86 may be either the lug or the recess. Preferably, the mating elements 84 on the extensions 83 define the lugs which pass through the panel apertures 81 and are releasably frictionally engaged by the mating elements 86 on the holder sidewall 50.

Where the panel extension 80 is present on one side of the panel 12b, the lateral extension 83 on that side will preferably define a laterally extending slot 88 which permits passage of the panel extension 80 therethrough and into the recess 82 of the holder sidewall 50.

The attachment of the holder 14 to the panel 12b is performed by the manufacturer of the storage package and lends itself to processing with automatic equipment. The separation of the holder 14 from the panel 12b will typically be done by the owner of the storage package when it is no longer needed and is easily accomplished simply by pulling the holder extensions 83 from their panel-securing orientation overlapping the holder body 40 and pulling them outwardly to their panel-releasing orientation wherein the extensions 83 extend outwardly from the holder body 14. Where the mating elements 84 of the lateral extensions 83 are the lugs, this action releases the lugs 84 from the panel apertures 81, thereby enabling easy separation of the holder 14 and panel 12b. Where the mating elements 86 on the holder sidewall 50 are the lugs, easy separation of the holder 14 and panel 12b is still possible, with the caveat that the panel 12b should be vertically displaced from the holder 14 until the panel apertures 81 clear the lugs 86.

Referring now to FIGS. 6–9, therein illustrated is a second embodiment of a storage package according to the present invention wherein the holder 14 is releasably secured to the panel 12b, without the use of glue, and easily separable therefrom for ecological purposes. Elements of the second embodiment which are identical in structure and function to elements of the first embodiment will be correspondingly numbered, while elements of the second embodiment which differ in either structure or function from similar elements in the first embodiment will be indicated by the corresponding number primed.

Panel 12a of the second embodiment (FIGS. 6–9) is similar to panel 12a of the first embodiment (FIGS. 1–5), each defining a compartment 32 for receipt of a booklet B. Panel 12b' of the second embodiment is generally similar to panel 12b of the first embodiment except that there are no sidewall apertures 81. (Although in the particular second embodiment illustrated, the second panel 12b' also lacks an extension 80, just as the holder sidewall 50 lacks a recess 82, it will be appreciated that the second embodiment may also be provided with a laterally extending spine 80 and recess 82, if desired.)

The holder 14' of the second embodiment is generally similar to holder 14 of the first embodiment except that it lacks the lateral extensions 83 and instead has each lateral holder sidewall 50 define at least one inwardly turned laterally extending lug 204 vertically spaced below the holder body 14'. As illustrated, there are three lugs 204 on each side, a long ledge-like lug at each end and a shorter central lug therebetween. The lugs 204 are conveniently formed on the holder body 40 by a molding operation known as swipe molding, with the lugs actually being the swipes.

The lugs 204 are vertically spaced from the holder body 40 sufficiently to enable the lateral sides 19 of panel 12b' to be inserted with a sliding movement intermediate the lugs 204 and the holder body 40, thereby to at least temporarily secure the panel 12b and the holder 14'. Preferably the engagement of the panel 12b and the holder 14' is snug, with the panel sides 19 being frictionally engaged between the lugs 204 and the holder body 40.

As a practical matter, it has been found that where the vertical spacing between the holder body 40 and the lugs 204 is sufficient to enable easy insertion of the lateral sides 19 of panel 12b therebetween, during ordinary use of the storage package the plastic component 14 tends to separate from the paperboard compartment 12a, 24', 12b'. Accordingly, the frictional engagement is preferably supplemented with an interference engagement.

Figure 6:
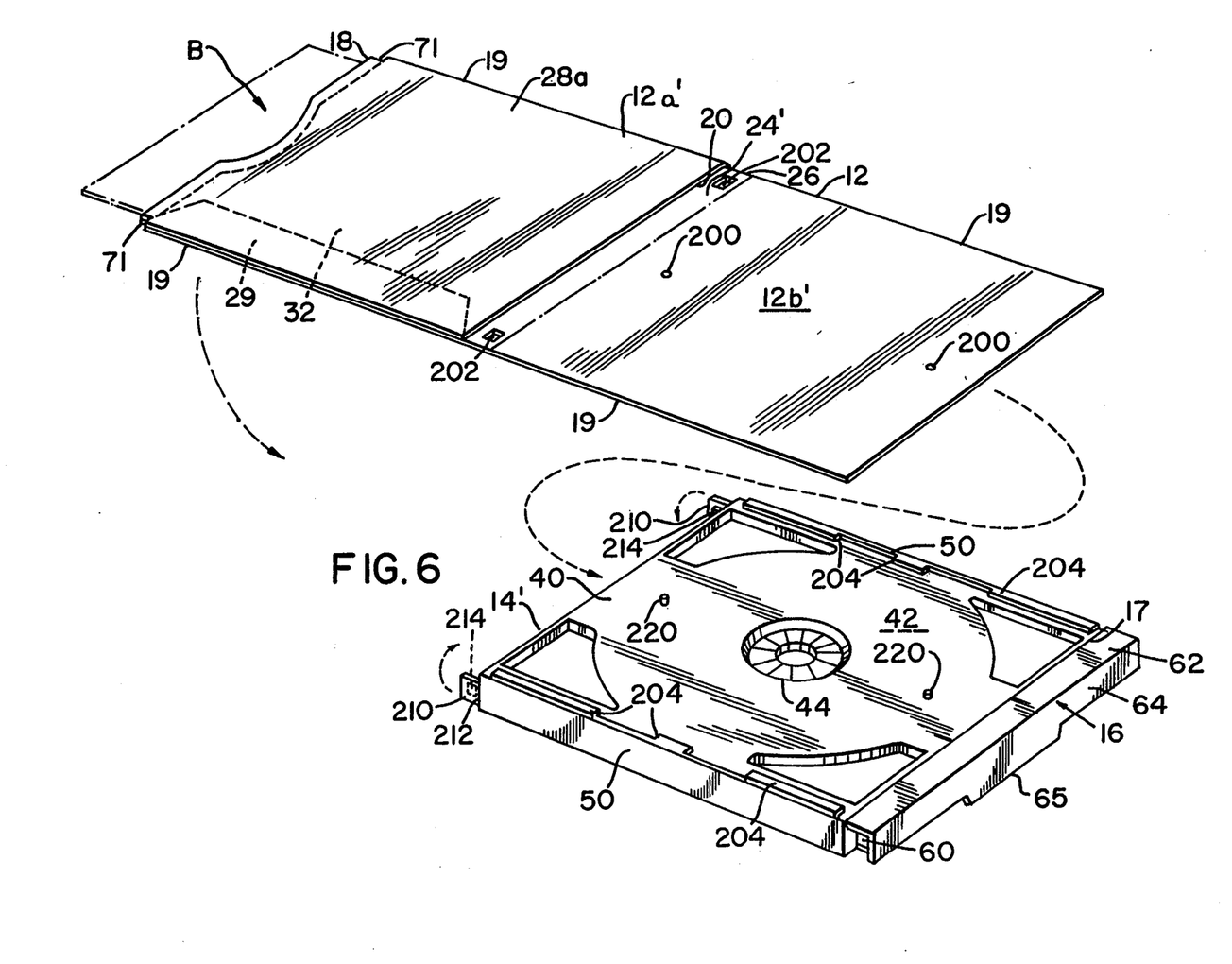
FIG. 6 is an inverted exploded isometric view of a second embodiment of a package according to the present invention.
Figure 7:
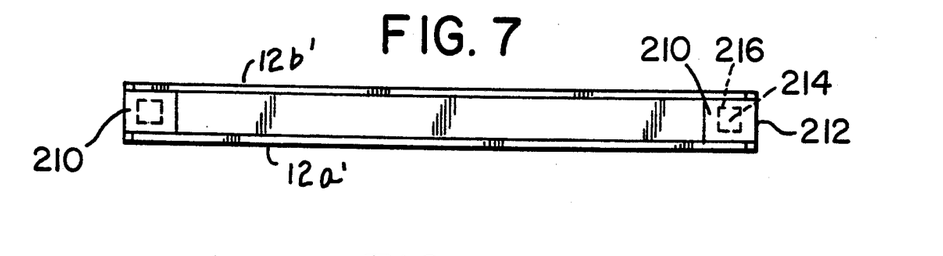
FIGS. 7 and 8 are side elevational and bottom plan views, respectively, of the second embodiment of the package in the collapsed orientation.
Figure 8:
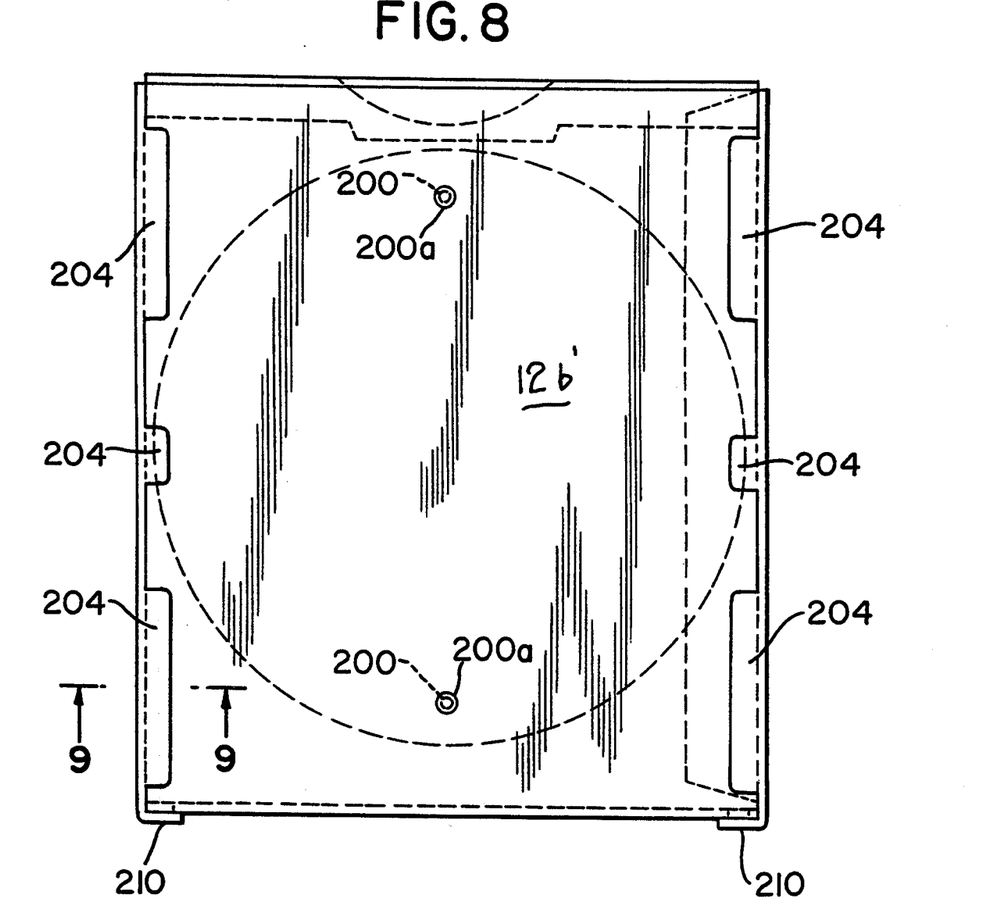
Figure 9:
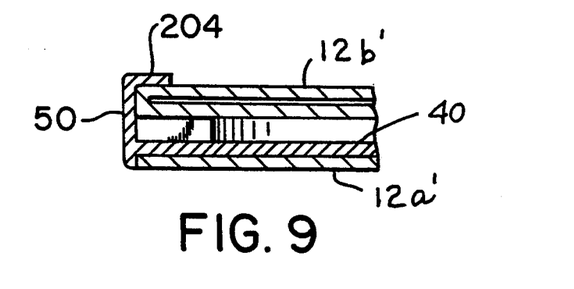
FIG. 9 is a fragmentary sectional view thereof taken along the line 9—9 of FIG. 8.

One preferred supplemental interference engagement is the provision of a transversely spaced pair of slots 202 on the strip 24' intermediate the foldlines 26, each slot 202 being provided adjacent a respective lateral side of the strip 24' and the provision of a pair of end flaps 210, each disposed on a respective holder sidewall 50 at the end thereof opposite end cap 16. Preferably each end flap 210 is secured to the holder sidewall 50 by a living hinge 212 (similar to the living hinges 17, 85 described hereinabove). Each of the end flaps 210 defines an inwardly facing projection 214 figured and dimensioned to pass through a respective slot 202 of strip 24' and be frictionally engaged in a recess 216 on the adjacent end of the holder body 40' adjacent the holder sidewall 50, the projections 214 and recesses 216 being adapted to releasably engage and fix the strip 24' and the holder 14' together (just as in the first embodiment the mating elements 84, 86 secure the panel 12b to the holder 14). Thus the end flaps 210 with projections 214 are movable between a strip-releasing orientation wherein they are spaced from the recesses 216 (as illustrated in FIG. 6) and a strip-engaging orientation wherein the projections 214 pass through strip slots 202 and engage recesses 216 to secure the strip 24' and the holder 14' together (as illustrated in FIGS. 7-9).

Another preferred supplemental interference engagement between the holder 14' and the panel 12b is the provision of one or more laterally spaced outwardly extending small pins 220 on the back of the holder body 40 (a pair of such pins 220 being illustrated) and a like number of laterally spaced, small mini-apertures 200 extending through panel 12b'. The pins 220 are configured and dimensioned such that they are short enough to enable the panel 12b' to be inserted intermediate the lugs 204 and holder body 40 and yet, especially when the panel 12b' is pressed against the holder body 40, to penetrate and extend through the mini-apertures 200 thereof. The passage of the pins 220 through the mini-apertures 200 may or may not result in some tearing of the panel 12b about the mini-apertures 200. This is of little consequence as thereafter the protruding free end of each pin 220 is preferably deformed with heat and/or pressure in order to form an enlarged head 220a of greater dimensions than either the pin 220 or the mini-aperture 200. The pin heads 220a lock the panel 12b' on the pins 200 to prevent relative lateral movement of the panel 12b' and the holder 14'. Incidentally, the expanded pin heads 220a conceal any unsightly tearing of the mini-apertures 200 by the pins 220.

Each of the supplemental interference engagements for reinforcing secural of the panel 12b' and the holder 14' together has its own characteristics. Thus, the use of pins 220 requires two additional manufacturing steps—namely, pushing of the pins 220 through the mini-apertures 200 and expanding of the free ends of the pins 220 to form heads 220a. An advantage of this technique is that the plurality of panels is movable to a completely flat orientation, with the strip 24' lying in the same plane as the panels 12a and 12b', thereby presenting an attractive, stable flat layout similar to the first embodiment. On the other hand, in order to remove the panel 12b' from the holder 14', it is necessary to rip at least the portions of the panel 12b' about the holes 200 to allow the panel to pass over pin heads 220a during separation.

By way of contrast, the use of end flaps 210 requires the manufacture of the holder 14' to form at least two additional living hinges 214. On the other hand, only one additional manufacturing step is required to cause the end flaps projections 214 to penetrate the strip slots 202 and become engaged by the holder body recesses 216. A unique characteristic of this particular technique for supplementing the attachment of the holder 14' and the panel 12b' with an interference fit is that the end flaps 210 maintain the strip 24' transverse to the panel 12b' so that the plurality of panels cannot assume the attractive flat orientation with the strip in the same plane as the panels. When it is desired to separate the two plastic and paperboard components, the end flaps 210 are swung outwardly so that the projections 214 thereon clear the strip slots 202, thereby enabling the panel 12b to be slid outwardly from the holder 14' without any tearing thereof.

It will be appreciated that, while the second embodiment is illustrated in FIGS. 6-9 as having both mini-apertures 200/pins 220 and end flaps 210/recesses 216, the second embodiment may be used without either thereof, with both thereof, or with only one thereof.

To summarize, the present invention provides packaging for a compact disc or the like which includes means for maintaining the packaging in the collapsed orientation, and means to prevent dog-earing, fraying or like destruction of the spines and the exposed sidewall edges of the paperboard panels. The package is ecologically sound, since it may be composed substantially of recycled and/or recyclable plastic and paperboard, as well as being simple and economical to manufacture. Additionally, the present invention provides in preferred embodiments such a package which has a paperboard lateral spine which can be easily and economically imprinted with identifying indicia, a compartment for releasably holding a booklet and maintaining the booklet away from the recording medium, and an easily releasable attachment of the plastic and non-plastic components thereof to facilitate an ecologically desirable separation therebetween.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. In a storage package for a recording medium comprising:
  A. a plurality of non-plastic panels including a pair of end panels, said plurality of panels being movable between an open orientation enabling access to contents of the package and a collapsed orientation for storage purposes, each of said panels having a generally planar and generally rectangular panel body, a pair of opposed transverse panel ends, and a pair of opposed lateral panel sides; and
  B. a holder formed of plastic disposed on one of said panels for receiving and maintaining a recording medium thereon, said holder having a generally planar and generally rectangular holder body, a pair of opposed lateral holder sides, and a pair of opposed transverse holder ends;
  the improvement wherein
    a given panel, which is one of said end panels and is not said one panel on which said holder is disposed, defines a compartment having a pair of opposed lateral compartment sides and a pair of opposed transverse compartment ends, said compartment having an open transverse compartment end at one end of said plurality of panels and being configured and dimensioned to removably receive printed matter therein through said open end;
    said one panel additionally defines at least one lateral spine visible when said plurality of panels is in said collapsed orientation; and
    said holder is releasably secured to said one panel and easily removable therefrom.

2. In a storage package for a recording medium comprising:
  A. a plurality of non-plastic panels including a pair of end panels, said plurality of panels being movable between an open orientation enabling access to contents of the package and a collapsed orientation for storage purposes, each of said panels having a generally planar and generally rectangular panel body, a pair of opposed transverse panel ends, and a pair of opposed lateral panel sides; and
  B. a holder formed of plastic disposed on one of said panels for receiving and maintaining a recording medium thereon, said holder having a generally planar and generally rectangular holder body, a pair of opposed lateral holder sides, and a pair of opposed transverse holder ends;
  the improvement wherein
    said holder is releasably secured to said one panel by means other than glue and easily removable therefrom.

3. In a storage a package for a recording medium comprising:
  A. a plurality of non-plastic panels including a pair of end panels, said plurality of panels being movable between an open orientation enabling access to contents of the package and a collapsed orientation for storage purposes, each of said panels having a generally planar and generally rectangular panel body, a pair of opposed transverse panel ends, and a pair of opposed lateral panel sides; and
  B. a holder formed of plastic disposed on one of said panels for receiving and maintaining a recording medium thereon, said holder having a generally planar and generally rectangular holder body, a pair of opposed lateral holder sides, and a pair of opposed transverse holder ends;
  the improvement wherein said package additionally includes releasable locking means, operative when said plurality of panels is in said collapsed orientation, to preclude accidental movement of any of said panels out of said collapsed orientation, said releasable locking means being releasably secured to said one panel by means other than glue and easily removable therefrom.

4. In a storage package for a recording medium comprising:
  A. a plurality of non-plastic panels including a pair of end panels, said plurality of panels being movable between an open orientation enabling access to the contents of the package and a collapsed orientation for storage purposes, each of said panels having a generally planar and generally rectangular panel body, a pair of opposed transverse panel ends, and a pair of opposed lateral panel sides; and
  B. a holder formed of plastic disposed on one of said panels for receiving and maintaining a recording medium thereon, said holder having a generally planar and generally rectangular holder body, a pair of opposed lateral holder sides, and a pair of opposed transverse holder ends;
  the improvement wherein
    said holder is releasably secured to said one panel by means other than glue and easily removably therefrom; and
  A. said one panel defines a series of panel apertures adjacent each of its lateral panel sides, said holder body defines adjacent each of its lateral holder sides a series of laterally spaced first mating elements, and said holder additionally includes a pair of lateral extensions, each said lateral extension being pivotally secured to a respective lateral holder side and defining a series of laterally spaced second mating elements releasably engageable with said series of first mating elements, each said lateral extension being pivotable between a non-engaging orientation wherein said series of first and second mating elements are spaced from each other to permit removal of said one panel from said holder and an engaging orientation wherein one of said series of first and second mating elements extends through said panel apertures and releasably engages the other of said series of first and second mating elements.

5. In a storage package for a recording medium comprising:
  A. a plurality of non-plastic panels including a pair of end panels, said plurality of panels being movable between an open orientation enabling access to the contents of the package and a collapsed orientation for storage purposes, each of said panels having a generally planar and generally rectangular panel body, a pair of opposed transverse panel ends, and a pair of opposed lateral panel sides; and
  B. a holder formed of plastic disposed on one of said panels for receiving and maintaining a recording medium thereon, said holder having a generally planar and generally rectangular holder body, a pair of opposed lateral holder sides, and a pair of opposed transverse holder ends;
  the improvement wherein
    said one panel additionally defines at least one lateral spine visible when said plurality of panels is in said collapsed orientation, said lateral spine being defined by an extension of one of said panel sides of said one panel, said lateral spine extending extending generally perpendicular to said body of said one panel and being secured to one of said holder sides; and said one holder side defines a recess communicating with said one panel side for receipt of said lateral spine.

6. The package of claim 5 wherein said recess is of sufficient depth to accommodate the full thickness of said lateral spine so that said lateral spine does not project laterally outwardly of said one holder side.

7. The package of claim 6 wherein said first mating elements are lugs, said second mating elements are recesses, and said lugs are frictionally engaged by said recesses when said lateral extensions are in said engaging orientation.

8. The package of claim 6 wherein each said lateral extension is secured to its respective lateral holder side by a living hinge.

9. The package of claim 6 wherein said one panel defines an opening therethrough, and said holder defines a pin projecting outwardly from said holder body and through said panel opening, thereby to assist in fixing said one panel on said holder against relative movement.

10. In a storage package for a recording medium comprising:

a plurality of nonplastic panels including a pair of end panels, said plurality of panels being movable between an open orientation enabling access to the contents of the package and a collapsed orientation for storage purposes, each of said panels having a generally planar and generally rectangular panel body, a pair of opposed transverse panel ends, and a pair of opposed lateral panel sides; and B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

the improvement wherein said holder is releasably secured to said one panel by means other than glue and easily removable therefrom; and each of said lateral holder sides defines at least one inwardly turned laterally extending lug vertically spaced from said holder body, said lateral panel side on each lateral side of said one panel being frictionally engaged between said at least one lug and said holder body.

11. The package of claim 10 wherein each of said lateral holder sides defines a plurality of laterally spaced lugs.

12. The package of claim 10 wherein said one panel defines an opening therethrough, and said holder defines a pin projecting outwardly from said holder body and through said one panel opening, thereby to assist in fixing said one panel on said holder against relative movement.

13. The package of claim 12 wherein said pin has a free end of greater diameter than said one panel opening.

14. In a storage package for a recording medium comprising:

A. a plurality of non-plastic panels including a pair of end panels, said plurality of panels being movable between an open orientation enabling access to the contents of the package and a collapsed orientation for storage purposes, each of said panels having a generally planar and generally rectangular panel body, a pair of opposed transverse panel ends, and a pair of opposed lateral panel sides; and B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

the improvement wherein said holder is releasably secured to said one panel by means other than glue and easily removable therefrom; and said plurality of panels defines a strip disposed intermediate said one panel and an adjacent one of said panels and adjacent one transverse holder end, said strip defining at least a pair of transversely spaced strip apertures, said holder body defines adjacent said one transverse holder end at least a pair of transversely spaced first mating elements, and said holder additionally includes a pair of transversely spaced transverse extensions adjacent said one transverse end, each said transverse extension being pivotally secured to a respects lateral holder side and defining at least one second mating element releasably engageable with one of said first mating elements, each said transverse extension being pivotable between a non-engaging orientation wherein said first and second mating elements are spaced from each other to permit removal of said plurality of panels from said holder end and an engaging orientation wherein one of said first and second mating elements extends through said strip apertures and releasably engages the other of said first and second mating elements to releasably secure said plurality of panels and said holder together.

15. The package of claim 14 wherein said first mating elements are lugs, said second mating elements are recesses, and said lugs are frictionally engaged by said recesses when said transverse extensions are in said engaging orientation.

16. The package of claim 14 wherein each said transverse extension is secured to its respective lateral holder side by a living hinge.

17. The package of claim 14 wherein said one panel defines an opening therethrough, and said holder defines a pin projecting outwardly from said holder body and through said one panel opening, thereby to assist in fixing said one panel on said holder against relative movement.

18. The package of claim 17 wherein said pin has a free end of greater diameter than said one panel opening.

19. In a storage package for a recording medium comprising:

A. a plurality of non-plastic panels including a pair of end panels, said plurality of panels being movable between an open orientation enabling access to contents of the package and a collapsed orientation for storage purposes, each of said panels having a generally planar and generally rectangular panel body, a pair of opposed transverse panel ends, and a pair of opposed lateral panel sides;

B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

C. releasable locking means, operative when said plurality of panels is in said collapsed orientation, to preclude accidental movement of any of said plurality of panels out of said collapsed orientation; the improvement wherein said holder and said releasable locking means are releasably secured to said one panel by means other than glue and easily removable therefrom.

20. In a storage package for a recording medium comprising:

A. a plurality of non-plastic panels including a pair of end panels, said plurality of panels being movable between an open orientation enabling access to the contents of the package and a collapsed orientation for storage purposes, each of said panels having a generally planar and generally rectangular panel body, a pair of opposed transverse panel ends, and a pair of opposed lateral panel sides; and B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

C. releasable locking means, operative when said plurality of panels is in said collapsed orientation, to preclude accidental movement of said plurality of panels out of said collapsed orientation; the improvement wherein said holder and said releasable locking means are releasably secured to said one panel by means other than glue and easily removable therefrom; and said one panel defines a series of panel apertures adjacent each of its lateral panel sides, said holder body defines adjacent each of its lateral holder sides a series of laterally spaced first mating elements, and said holder additionally includes a pair of lateral extensions, each said lateral extension being pivotally secured by a living hinge to a respective lateral holder side and defining a series of laterally spaced second mating elements releasably engageable with said series of first mating elements, each said lateral extension being pivotable between a non-engaging orientation wherein said series of first and second mating elements are spaced from each other to permit removal of said one panel from said holder and an engaging orientation wherein one of said series of first and second mating elements extends through said panel apertures and releasably engages the other of said series of first and second mating elements, 21. In a storage package for a recording medium comprising:

A. a plurality of non-plastic panels including a pair of end panels, said plurality of panels being movable between an open orientation enabling access to the contents of the package and a collapsed orientation for storage purposes, each of said panels having a generally planar and generally rectangular panel body, a pair of opposed transverse panel ends, and a pair of opposed lateral panel sides; and B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

C. releasable locking means, operative when said plurality of panels is in said collapsed orientation, to preclude accidental movement of said plurality of panels out of said collapsed orientation; the improvement wherein said holder and said releasable locking means are releasably secured to said one panel by means other than glue and easily removable therefrom; and;

each of said lateral holder sides defines a plurality of laterally spaced, inwardly turned, laterally extending lugs vertically spaced from said holder body, said lateral panel side on each lateral side of said one panel being frictionally engaged between said lugs and said holder body.

22. In a storage package for a recording medium comprising:

A. a plurality of non-plastic panels including a pair of end panels, said plurality of panels being movable between an open orientation enabling access to contents of the package and a collapsed orientation for storage purposes, each of said panels having a generally planar and generally rectangular panel body, a pair of opposed transverse panel ends, and a pair of opposed lateral panel sides; and B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

the improvement wherein said one panel additionally defines a lateral spine extending laterally parallel to said lateral holder sides and visible when said plurality of panels is in said collapsed orientation.

23. The package of claim 22 wherein said lateral spine is defined by an extension of one of said panel sides of said one panel, said lateral spine extending generally perpendicular to said body of said one panel and being secured to one of said holder sides.

24. The package of claim 23 wherein said lateral spine has visibly displayed thereon identifying indicia for said package.

25. The package of claim 23 wherein said lateral spine extends at least a major portion of the length of said one panel side.

26. The package of claim 22 wherein said plurality of panels in said collapsed orientation additionally defines at least one transverse spine.

27. The package of claim 22 wherein said one panel defines a pair of lateral spines.

28. The package of claim 27 wherein said pair of lateral spines are disposed one on either side of said one panel.

29. The package of claim 27 wherein said lateral spine is disposed on and at least partially covers one of said lateral holder sides.

30. In a storage package for a recording medium comprising:

A. a plurality of non-plastic panels including a pair of end panels, said plurality of panels being movable between an open orientation enabling access to contents of the package and a collapsed orientation for storage purposes, each of said panels having a generally planar and generally rectangular panel body, a pair of opposed transverse panel ends, and a pair of opposed lateral panel sides; and B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

the improvement wherein said one panel additionally defines a lateral spine visible when said plurality of panels is in said collapsed orientation, said lateral spine being defined by an extension of one of said panel sides of said one panel, said lateral spine extending generally perpendicular to said body of said one panel and being secured to one of said holder sides, said lateral spine extending at least a major portion of the length of said one panel side and having visibly displayed thereon identifying indicia for said package; and said one holder side defining a recess communicating with said one panel side for receipt of said lateral spine, said recess being of sufficient depth to accommodate the full thickness of said lateral spine so that said lateral spine does not project laterally outwardly of said one holder side.

31. In a storage package for a recording medium comprising:

A. a plurality of non-plastic panels including a pair of end panels, said plurality of panels being movable between an open orientation enabling access to contents of the package and a collapsed orientation for storage purposes, each of said panels having a generally planar and generally rectangular panel body, a pair of opposed transverse panel ends, and a pair of opposed lateral panel sides; and B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

the improvement wherein a given panel, which is one of said end panels and is not said one panel on which said holder is disposed, defines a compartment having a pair of opposed lateral compartment sides and a pair of opposed transverse compartment ends, said compartment having an open transverse compartment end at one end of said plurality of panels and being configured and dimensioned to removably receive printed matter therein through said open end.

32. The package of claim 31 wherein said given panel is defined by a folded-over flap, with one lateral compartment side formed by folding over of said flap and the other lateral compartment side formed by securing portions of the adjacent lateral edges of said flap together, said flap having means associated therewith for securing portions of a pair of adjacent transverse edges of said flap together to define a closed transverse compartment end.

33. The package of claim 31 additionally including releasable locking means, operative when said plurality of panels is in said collapsed orientation, to preclude accidental movement of said plurality of panels out of said collapsed orientation, said releasable locking means when operative furthermore functionally closing said open transverse compartment end.

34. In a storage package for a recording medium comprising:

A. a plurality of non-plastic panels including a pair of end panels, said plurality of panels being movable between an open orientation enabling access to contents of the package and a collapsed orientation for storage purposes, each of said panels having a generally planar and generally rectangular panel body, a pair of opposed transverse panel ends, and a pair of opposed lateral panel sides; and B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

the improvement wherein a given panel, which is one of said end panels and is not said one panel on which said holder is disposed, defines a compartment having a pair of opposed lateral compartment sides and a pair of opposed transverse compartment ends, said compartment having an open transverse compartment end at one end of said plurality of panels and being configured and dimensioned to removably receive printed matter therein;

said given panel being defined by a folded-over flap, with one lateral compartment side formed by folding over of said flap and the other lateral compartment side formed by securing portions of the adjacent lateral edges of said flap together, said flap having means associated therewith for securing portions of a pair of adjacent transverse edges of said flap together to define a closed transverse compartment end; and releasable locking means, operative when said plurality of panels is in said collapsed orientation, to preclude accidental movement of said plurality of panels out of said collapsed orientation, said releasable locking means when operative furthermore functionally closing said open transverse compartment end.

35. In a storage package for a recording medium comprising:

A. a plurality of non-plastic panels including a pair of end panels, said plurality of panels being movable between an open orientation enabling access to the contents of the package and a collapsed orientation for storage purposes, each of said panels having a generally planar and generally rectangular panel body, a pair of opposed transverse panel ends, and a pair of opposed lateral panel sides; and B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

the improvement wherein said holder is releasably secured to said one panel by means other than glue and easily removable therefrom; and said holder body defines adjacent each of its lateral holder sides a series of laterally spaced first mating elements, and said holder additionally includes a pair of lateral extensions, each said lateral extension being pivotally secured to a respective lateral holder side and defining a series of laterally spaced second mating elements releasably engageable with said series of first mating elements, each said lateral extension being pivotable between a non-engaging orientation wherein said series of first and second mating elements are spaced from each other to permit removal of said one panel from said holder and an engaging orientation wherein one of said series of first and second mating elements releasably engages the other of said series of first and second mating elements to preclude removal of said one panel from said holder.

36. The storage package of claim 35 additionally including:

C. releasable locking means, operative when said plurality of panels is in said collapsed orientation, to preclude accidental movement of said plurality of panels out of said collapsed orientation, said releasable locking means being releasably secured to said one panel by means other than glue and easily removable therefrom; and wherein each said lateral extension is pivotally secured by a living hinge to a respective lateral holder side.

37. In a storage package for a recording medium comprising:

A. a plurality of non-plastic panels including a pair of end panels, said plurality of panels being movable between an open orientation enabling access to the contents of the package and a collapsed orientation for storage purposes, each of said panels having a generally planar and generally rectangular panel body, a pair of opposed transverse panel ends, and a pair of opposed lateral panel sides; and B. a holder formed of plastic disposed on one of said panels for receiving and maintaining a recording medium thereon, said holder having a generally planar and generally rectangular holder body, a pair of opposed lateral holder sides, and a pair of opposed transverse holder ends;

the improvement wherein said holder is releasably secured to said one panel by means other than glue and easily removable therefrom; and said one panel defines a series of panel apertures adjacent each of its lateral panel sides, and said holder additionally includes a pair of lateral extensions, each said lateral extension being pivotally secured to a respective lateral holder side, and one of said holder body and said lateral extension defining a series of laterally spaced lugs, each said lateral extension being pivotable between a non-engaging orientation wherein said series of lugs is spaced from the other of said holder body and said lateral extension to permit removal of said one panel from said holder and an engaging orientation wherein said series of lugs extends through said panel apertures to preclude removal of said one panel from said holder.

38. The package of claim 37 including means for releasably maintaining said lateral extensions in said engaging orientation.

39. The package of claim 38 additionally including:

C. releasable locking means, operative when said plurality of panels is in said collapsed orientation, to preclude accidental movement of said plurality of panels out of said collapsed orientation, said releasable locking means being releasably secured to said one panel by means other than glue and easily removable therefrom; and wherein each said lateral extension is pivotally secured by a living hinge to a respective lateral holder side.

40. The package of claim 39 including means for releasably maintaining said lateral extensions in said engaging orientation.

* * * * *